Patented Apr. 24, 1934

1,956,484

UNITED STATES PATENT OFFICE 1,956,484

PROTECTION OF MOTOR VEHICLES, AIRCRAFT, AND THE LIKE, IN CASE OF ACCIDENT AND AGAINST THEFT

Basil Dixon Bate, Chester, England

Application April 13, 1932, Serial No. 605,107

21 Claims. (Cl. 123—146.5)

This invention has for its object to provide simple and effective means whereby a vehicle or aircraft driven by an internal combustion engine can be protected from fire due to damage to the electrical equipment causing ignition of fuel or inflammable material upon the vehicle or aircraft arising from an accident in which the vehicle has struck an obstruction, or due to the continued operation of the engine of the vehicle or aircraft after such an accident. A further object is to provide such means in a form in which they can be used to prevent theft of the vehicle or the like.

The invention comprises the provision upon the vehicle or aircraft (hereinafter termed vehicle for convenience of reference) of a mass or weight so supported that upon the impact of the vehicle with an obstruction, the mass or weight actuates means which allow or cause (1) the isolation of the electric accumulator from the distribution system, (2) the cutting off of the fuel supply to the engine, (3) the earthing of the magneto, (4) the isolation of the ignition coil from the accumulator and dynamo and (5) the earthing of the dynamo positive or any one or more of these operations.

The invention further comprises the arrangement wherein the weight or mass operates to trip a mechanism which effects one or more of the aforesaid operations.

The invention further comprises the mounting of the weight or mass upon a member of a toggle lever mechanism which acts to hold a spring loaded operating lever (for performing one or more of the aforesaid operations), in its out-of-service position, the said weight or mass, upon the vehicle striking an obstruction, tripping the toggle lever mechanism, so allowing the spring to operate the lever which then performs one or more of the said operations.

The invention further comprises the provision of means for adjusting the sensitiveness of the action of the mass or weight, and for ensuring that movements or shocks not due to head-on impact do not trip the toggle mechanism.

The invention further comprises the arrangement wherein until the trip mechanism has been actually released, the lever locked by said mechanism does not move any of the control members which it operates.

The invention further comprises the provision of means whereby the trip mechanism is released by impact forces in either of two directions substantially at right angles to one another.

The invention further comprises the provision of means for operating the trip mechanism positively and for resetting the same so that such mechanism can be used as a control and safety device for the vehicle. The positive operating means may be locked to prevent unauthorized use of the vehicle.

Referring to the accompanying explanatory drawings:—

The same reference letters in the two views indicate the same parts.

Figure 1:
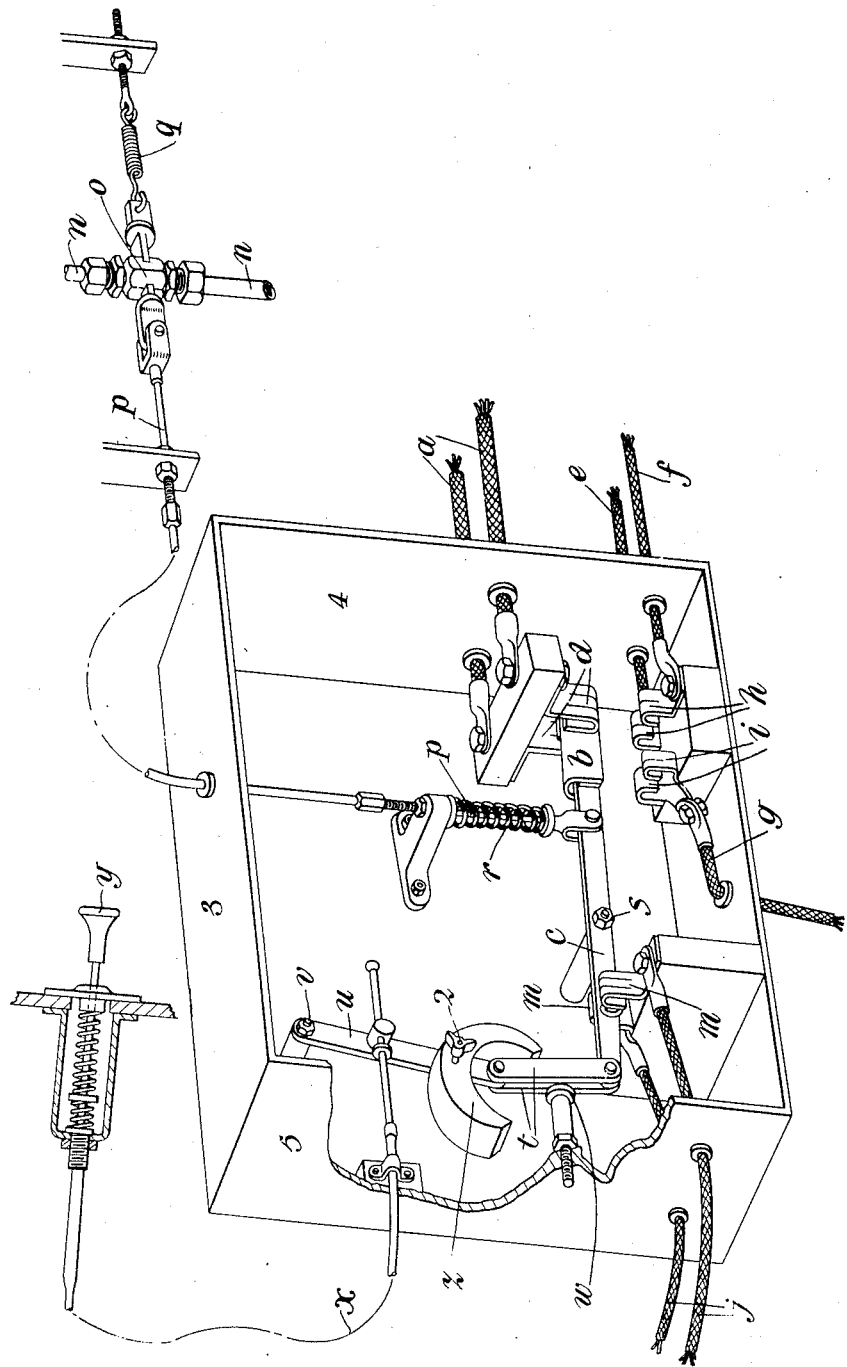
Figure 1 shows one form of control mechanism arranged in accordance with my invention.

In Figure 1, $a$ indicates the main leads of the accumulator upon the vehicle. The said leads can be connected by a movable contact $b$ upon the lever $c$ bridging the fixed contacts $d$. $e$ indicates a lead from the ignition magneto contact breaker and $f$ a lead from the positive terminal of the dynamo charging the accumulator. The leads $e$ and $f$ can both be connected to the earth lead $g$ by the movable contact $b$ on the lever $c$ bridging between the contacts $h$ and $i$. $j$ indicates the leads to the coil of a coil ignition unit. Normally the leads $j$ are connected by the lever $c$ bridging the contacts $m$ to which the leads are coupled. $n$ indicates the fuel supply line which has a control tap $o$ therein. This tap is connected by the wire or cable $p$ with the lever $c$ so that downward movement of the lever at the point of connection to the cable causes the closing of the tap $o$ against the pull of the spring $q$. The cable $p$ may be of the push pull type, if desired. A spring $r$ tends to press the lever $c$ downwards at the right hand side of the lever fulcrum $s$.

At the end of the lever $c$ opposite to that having the contact $b$ therein, it is connected to a toggle lever comprising one or two links $t$ pivoted to $c$ and one link $u$ pivoted to $t$ and to a fixed pivot $v$. An adjustable stop $w$ limits the movement of the toggle lever beyond the position in which the links $t$ and $u$ are in line and a push-pull flexible cable $x$ controlled by the handle or knob $y$ serves to bring the toggle links into their locking position against the stop $w$ or to move them in the opposite direction to destroy the toggle action and allow the links to collapse upon one another in the known manner. Upon the link $u$ is carried the weight $z$ which can be secured by a screwed stud 2 or other means to $u$ at any point in its length between its fixed pivot at $v$ and its connection to the links $t$ in order to adjust the action of the weight as hereinafter more fully described.

The mechanism is preferably contained within a box 3, the end 4 of which faces the front of the vehicle and the end 5, the back of the vehicle.

The operation of the mechanism is as follows:—Should the vehicle strike an obstruction, the sudden check to the motion of the vehicle will result in the weight $z$ due to its momentum carrying the pivotal connection of the links $t$ and $u$ to the right of a line joining the pivot $v$ to the pivotal connection of $t$ with $c$, when the spring $r$ will be free to depress the right hand end of the lever $c$ and raise the left hand end. The main battery circuit will therefore be broken by the contact $b$ and the magneto and the dynamo positive will be earthed by the same terminal. At the same time the fuel supply will be cut off by the tap $o$ and the ignition coil leads $j$ will be electrically disconnected by the lever $c$. Damage to the vehicle resulting from the impact with the obstruction cannot result in fire, due to damage of the electric leads on the vehicle igniting the fuel, for the electrical system will be dead and the fuel supply cut off. Also the engine will be stopped because the magneto is earthed, the coil disconnected and the dynamo rendered inoperative.

To reset the mechanism after an accident, the handle $y$ is pulled, when the toggle is moved to the position shown with the links $t$ against the stop $w$.

The handle $y$ may be arranged in conjunction with a lock controlled by a key, so that the mechanism can be used as a preventative of theft of the vehicle.

By adjusting the weight $z$ in position along the link $u$, I can control the sensitiveness of the device so as to ensure that no degree of braking of the vehicle will bring the mechanism into operation. In practice, I find the mechanism to be readily adjusted to ensure that it operates only on impact of the vehicle with an obstruction.

The weight $z$ is so arranged with relation to its point of connection to the link $u$, that up and down movements of the vehicle do not tend to release the toggle but rather they tend to hold the toggle against the stop $w$. Adjustment of the latter also controls the sensitiveness of the mechanism.

Figure 2:
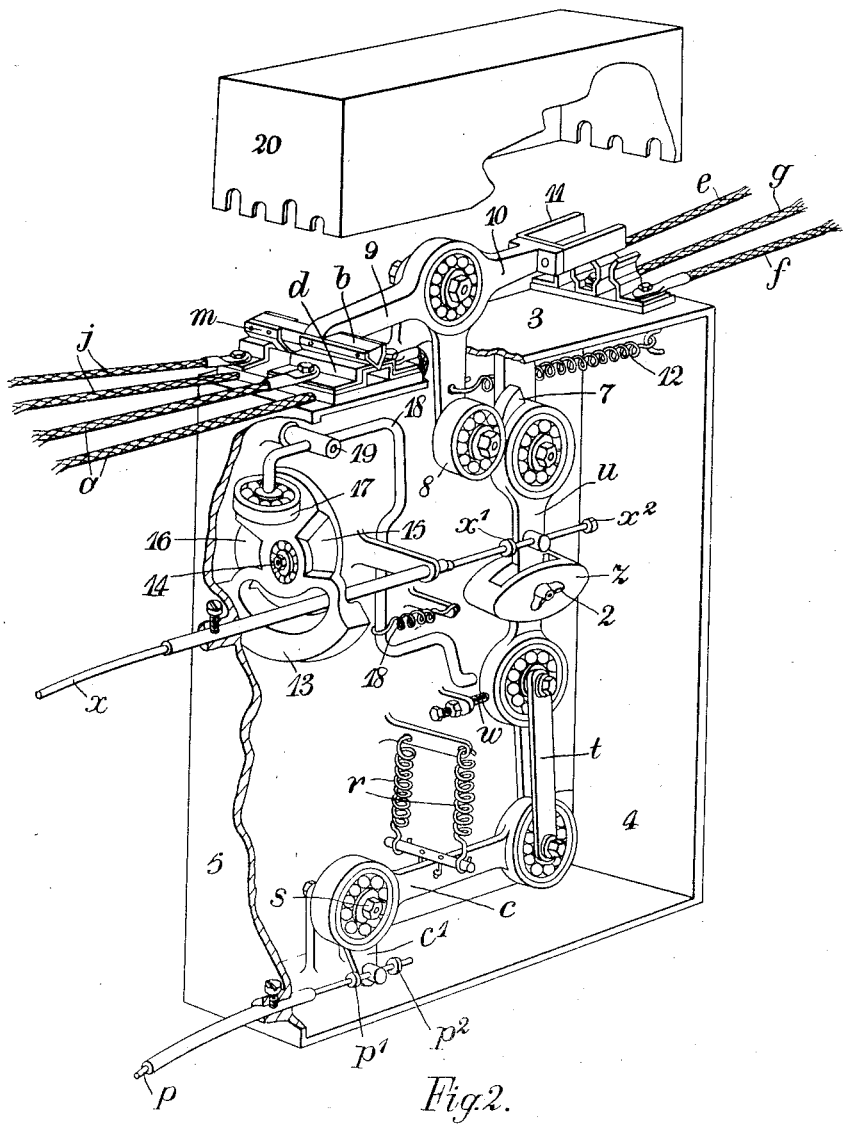
Figure 2 shows a modified form of such mechanism.

In Figure 2, the moving parts are shown carried in ball or antifriction bearings, and in addition the parts are so arranged that until the toggle levers $t$ and $u$ have collapsed or passed over the dead centre position and to the right in the figure, no operative movement is transmitted to the switches and fuel control tap. By this means it is ensured that the resistance which the weight $z$ has to overcome to collapse the toggle is constant and the operation of the switches and taps is effected entirely independently of the toggle. It will be seen that the cable $p$ leading to the fuel control tap has two collars $p^1$ and $p^2$ thereon between which an arm $c^1$ upon the pivotal end of the lever $c$, moves so that such arm $c^1$ does not engage the collar $p^2$ to close the fuel tap until the toggle has collapsed. There is a similar arrangement of two collars $x^1$ and $x^2$ upon the cable $x$ for the hand control of the toggle so that such collars are clear of the toggle during its automatic functioning. The springs $r$ in Figure 2 tend to raise the lever $c$ which is fulcrumed about the fixed point $s$. There is a cam 7 upon the boss like upper end of the toggle lever $u$ and such cam 7, when the toggle has been collapsed, engages the end 8 of the three armed lever shown, one arm 9 of which carries the contact $b$ for making and breaking the connection between the main battery leads $a$ and between the coil leads $j$, whilst another arm 10 carries the wiper blades 11 to engage the terminals of the magneto and dynamo positive leads $e$ and $f$ and earth the same by the lead $g$. A spring 12 draws the end 8 towards the cam 7, but the contacts $b$, $d$ and $m$ limit such movement so that 8 does not come into contact with the cam 7 until the toggle has actually been collapsed.

I may provide an oscillatory weighted body 13 freely carried by a fixed pin 14 and having cam like recesses 15 and 16 at opposite sides with which can engage a ring 17 upon a lever 18 pivoted at 19 and adapted to engage the pivotal point of the toggle links $t$ and $u$. With this arrangement, an impact force transversely to the impact force which causes the movement of the weight $z$ or the turning over of the vehicle will cause the oscilatory movement of the weight and allow the part 17 to enter one or other of the depressions 15, 16, when the lever 18 will engage the toggle levers and cause the collapse of the toggle lock. I arrange that the weight 13 has to move through a very substantial angle before the lever 18 is moved so as to ensure that such lever is moved only following impact or overturning of the vehicle to which the device is fitted. 20 is a detachable cover for the parts on the top of the casing 3.

My device can be made in a simple and compact manner as a self-contained fitting adapted to be installed in a vehicle and coupled up to the electrical and other parts as described. It will, of course, be understood that the device may not control all the parts indicated. For example, a vehicle may have magneto or coil ignition only and control of the dynamo may not be considered essential to safety in some cases.

My improvement is very advantageous as a means of protecting aircraft against fire following an accident in which the aircraft strikes an obstruction. It may be utilized to operate a fire extinguisher over the engine, if desired.

What I claim is:—

1. The combination in apparatus for the protection of motor vehicles, aircraft or the like in case of accident, of a toggle linkage including a lever; a weight mounted upon said toggle linkage and spring means causing said lever to effect an operation for the said protection upon collapse of said toggle linkage due to the momentum of said weight upon impact of the motor vehicle, aircraft or the like.

2. The combination in apparatus for the protection of motor vehicles, aircraft or the like in case of accident of a toggle lever mechanism, a weight upon a member of said toggle lever mechanism, a spring loaded lever held in its out of service position by said toggle lever mechanism which is tripped by said weight upon the vehicle striking an obstruction, and collapses to allow said spring loaded lever to effect an operation for the said protection.

3. The combination in apparatus for the protection of motor vehicles, aircraft or the like having an electric accumulator circuit adapted to be broken in case of accident, of a toggle linkage, a weight mounted upon said toggle linkage, a lever movable by said toggle linkage, a contact on said lever adapted to bridge fixed contacts to complete the said accumulator circuit when said lever is locked by said toggle linkage, and a spring operatively associated with said lever, causing it to move to withdraw said contact from said fixed contacts when the toggle action is destroyed due to the momentum of said weight upon impact of the motor vehicle, aircraft or the like.

4. The combination in apparatus for the protection of motor vehicles, aircraft or the like having an electric accumulator circuit adapted to be broken in case of accident, of a toggle linkage, a weight adjustably mounted upon one member of said toggle linkage, a lever pivoted to said toggle linkage and having a fixed fulcrum, a contact on said lever adapted to bridge fixed contacts to complete the said accumulator circuit when said lever is locked by said toggle linkage, and a spring operatively associated with said lever causing it to pivot about said fixed fulcrum to withdraw said contact from said fixed contacts when the toggle action is destroyed due to the momentum of said weight upon impact of the motor vehicle, aircraft or the like.

5. The combination in apparatus for the protection of motor vehicles, aircraft or the like having an electric accumulator circuit adapted to be broken in case of accident, of a toggle linkage, including a cam-shaped member, a weight mounted upon said toggle linkage, a lever spaced from said cam-shaped member, a contact on said lever adapted normally to bridge fixed contacts to complete the said accumulator circuit, and a spring operatively associated with said toggle linkage which upon collapse of the latter due to the momentum of said weight upon impact of the motor vehicle, aircraft or the like causes said cam-shaped member to contact with said lever to withdraw said contact from said fixed contacts to break the accumulator circuit.

6. The combination in apparatus for the protection of motor vehicles, aircraft or the like in case of accident, of a toggle linkage, a lever associated with said toggle linkage, spring means tending to cause said lever to effect an operation for the said protection but normally restrained by the locking action of said toggle linkage, and a weight mounted upon said toggle linkage the momentum of which upon impact of the motor vehicle, aircraft or the like causes said toggle linkage to collapse and said operation to be effected.

7. The combination in apparatus for the protection of motor vehicles, aircraft or the like in case of accident, of a toggle linkage, a lever pivoted to said toggle linkage, spring means operatively associated with said lever tending to cause it to effect an operation for the said protection but normally restrained by the locking action of said toggle linkage, and a weight mounted upon said toggle linkage the momentum of which upon impact of the motor vehicle, aircraft or the like causes said toggle linkage to collapse to allow said spring means to cause said lever to effect said operation.

8. The combination in apparatus for the protection of motor vehicles, aircraft or the like in case of accident, of a toggle linkage including a cam-shaped member, a lever normally in spaced relation to said cam-shaped member, a spring maintaining said lever in said spaced relation and restraining it from effecting an operation for the said protection, a weight mounted upon said toggle linkage the momentum of which upon impact of the motor vehicle, aircraft or the like causes said toggle linkage to collapse, and spring means operatively associated with said toggle linkage which upon collapse of the latter causes said cam-shaped member to contact with said lever to cause it to effect said operation against the restraining influence of said spring.

9. The combination in apparatus for the protection of motor vehicles, aircraft or the like having an electric accumulator circuit adapted to be broken in case of accident, of a toggle linkage, a lever pivoted to said toggle linkage and having a fixed fulcrum, a contact on said lever adapted to bridge fixed contacts to complete the said accumulator circuit when said lever is locked by said toggle linkage, spring means operatively associated with said lever tending to cause it to pivot about said fixed fulcrum to withdraw said contact from said fixed contacts but normally restrained by the locking action of said toggle linkage, and a weight mounted upon said toggle linkage the momentum of which upon impact of the motor vehicle, aircraft or the like causes said toggle linkage to collapse to allow said spring means to pivot said lever and break the accumulator circuit.

10. The combination in apparatus for the protection of motor vehicles, aircraft or the like having an electric accumulator circuit adapted to be broken, in case of accident, of a toggle linkage including a cam-shaped member, a pivotally mounted lever normally in spaced relation to said cam-shaped member, a contact on said lever adapted normally to bridge fixed contacts to complete the said accumulator circuit, a spring maintaining said lever in said spaced relation and restraining it from pivotal movement to withdraw said contact from said fixed contacts, a weight mounted upon said toggle linkage the momentum of which upon impact of the motor vehicle, aircraft or the like causes said toggle linkage to collapse, and spring means operatively associated with said toggle linkage which upon collapse of the latter causes said cam-shaped member to contact with said lever to cause it to pivot and break the accumulator circuit.

11. The combination with apparatus for the protection of motor vehicles, aircraft or the like as claimed in claim 9, of fixed contacts in leads from the magneto contact breaker and dynamo positive, and a fixed earth contact adjacent thereto, the contact on said pivoted lever bridging said contacts to earth the magneto and dynamo positive when it pivots to break the accumulator circuit.

12. The combination with apparatus for the protection of motor vehicles, aircraft or the like, as claimed in claim 9, of a further contact on said lever at the opposite side of said fixed fulcrum, and contacts in the ignition coil leads normally bridged by said further contact but disconnected when said lever pivots to break the accumulator circuit.

13. The combination with apparatus for the protection of motor vehicles, aircraft or the like as claimed in claim 7, of means for moving said weight to collapse said toggle linkage and for resetting said weight to restore the toggle lock.

14. The combination with apparatus for the protection of motor vehicles, aircraft or the like, as claimed in claim 7, of a push-pull flexible cable connected to said toggle linkage, and means for operating said flexible cable to collapse said toggle linkage and to reset the latter.

15. The combination with apparatus for the protection of motor vehicles, aircraft or the like as claimed in claim 9, of a flexible cable connected to said lever and to a control tap in the fuel supply line, so that when said lever pivots to break the accumulator circuit the control tap is also operated to cut off the fuel supply.

16. The combination with apparatus for the protection of motor vehicles, aircraft or the like as claimed in claim 10, of means for collapsing said toggle linkage upon transverse impact or overturning of the motor vehicle, aircraft or the like.

17. The combination with apparatus for the protection of motor vehicles, aircraft or the like as claimed in claim 10, of an oscillatory weighted body having recesses therein and oscillating in a plane at right angles to the movement of the weight upon said toggle linkage a pivotally mounted member normally contacting with said oscillatory weighted body and extending to adjacent said toggle linkage, and spring mean holding said member adjacent the said toggle linkage, an excessive oscillation of said oscillatory weighted body causing said pivotally mounted member to fall within one of said recesses and said spring means to pivot said member to contact with said toggle linkage to collapse the latter.

18. The combination with apparatus for the protection of motor vehicles, aircraft or the like as claimed in claim 10 and also having ignition coil leads, of fixed contacts in the said ignition coil leads adjacent to said fixed contacts in the main accumulator circuit, and a further contact on said lever, adjacent to said contact bridging said fixed contacts in the main accumulator circuit, bridging said fixed contacts in the ignition coil leads.

19. The combination with apparatus for the protection of motor vehicles, aircraft or the like as claimed in claim 10, of a fixed contact in a lead from the ignition magneto, a fixed contact in a lead from the dynamo positive arranged parallel with said fixed contact in the lead from the ignition magneto, a contact arranged between said fixed contacts and connected to earth, and a pronged wiper blade on said lever which when the latter pivots to break the accumulator circuit simultaneously connects the ignition magneto and dynamo positive to earth.

20. The combination with apparatus for the protection of motor vehicles, aircraft or the like as claimed in claim 10, of a second lever connected to said toggle linkage and pivoted under the action of said spring means upon collapse of said toggle linkage, and a flexible cable connected to a control tap in the fuel supply line and to said second lever through a lost motion device, so that said control tap is unaffected until said toggle linkage has collapsed.

21. The combination with apparatus for the protection of motor vehicles, aircraft or the like as claimed in claim 10, of a push-pull flexible cable connected to said toggle linkage through a lost motion device, and means for operating said flexible cable to collapse said toggle linkage and to re-set the latter.

BASIL DIXON BATE.